United States Patent Office 3,502,604
Patented Mar. 24, 1970

3,502,604
IMPACT RESISTANT RESIN COMPOSITIONS AND METHOD OF PRODUCTION THEREOF
Kazuo Nakatsuka, Fumio Ide, and Ryoji Handa, Ohtakashi, and Seiji Deguchi, Hiroshima-ken, Japan, assignors to Mitsubishi Rayon Co., Ltd., Tokyo, Japan, a corporation of Japan
No Drawing. Filed Dec. 13, 1966, Ser. No. 601,317
Claims priority, application Japan, Dec. 15, 1965, 40/76,729; Dec. 28, 1965, 41/80,550
Int. Cl. C08f 29/46, 29/38; C09d 5/02
U.S. Cl. 260—29.6                     5 Claims

ABSTRACT OF THE DISCLOSURE

A thermoplastic resin composition consisting of a rigid resin polymer and a novel cross-linked acrylic elastomer is prepared by cross-linking a polymer in the form of a latex with an organic peroxide. The resin composition thus prepared has excellent impact and weather resistance.

This invention relates to thermoplastic resin composition excellent in impact resistance and weather resistance, which is obtained by use of cross-linked elastomers having excellent mechanical properties, and a method for producing the same.

Various reports have heretofore been made on the production of impact resistant resins. The fundamental viewpoint in the production of impact resistant resins may reside in a method which comprises various means for incorporating elastomer into resin which has by itself properties such as stiffness and brittleness. Properties of the resin composition obtained in such a manner as mentioned above are dominated by the elastomer incorporated therein. Presently, a greater part of such resin compositions being commercially produced include the diene elastomers. Such compositions have excellent impact resistance, processability and mechanical properties. The compositions, however, have such serious defects that weather resistance is low, that various mechanical properties, particularly impact strength are significantly lowered with the elapse of time, and that the product becomes colored due to the presence of double bond in the main chain of elastomer contained. According to the experiments carried out by the present inventors, impact strength of such compositions is lowered to less than ½–⅓, even to less than ⅕ in the worst case, by subjecting the compositions to accelerated exposure in "Weather-o-meter" to correspond to a period of half a year. As a matter of course, it is considered that elastomers having no double bond in the main chains, for example, such as ethylene-propylene copolymer and acrylic ester elastomer are employed in order to overcome the above defects. In such case, however, it is different to obtain the aimed resin composition, because ethylene-propylene copolymer itself is very poor in compatibility with other resins, and therefore in order to obtain the aimed resin composition, it may only be possible to achieve the object by chemically bonding the resin and elastomer with each other, for example, by graft polymerization. However, various difficulties may be encountered in obtaining the aimed graft polymer by employing usual radical polymerization process for ethylene-propylene elastomer. On the other hand, methods for producing resin compositions which comprises employing elastomers composed mainly of alkyl acrylates have been known. For example, such methods are disclosed in Japanese patent publication Nos. 17,472/62; 11,069/64; and 11,288/63.

Though weather resistance of resin compositions obtained by above-mentioned methods is excellent, their moulding processability and impact resistance are considerably inferior to those of resin compositions obtained by employng the diene elastomers. As elastomers to be used as resin composition components, it is preferable to employ those having (1) good compatibility between elastomer and resin component, (2) toughness of elastomer itself, and (3) low glass transition temperature of elastomer. The reason that the above-mentioned compositions are inferior in properties to those having the diene elastomers is considered to be particularly attributable to the foregoing (1) and (2). In this respect, the above-mentioned known methods aimed at the improvements thereof for example, by graft polymerization, but the results were not found to be sufficiently satisfactory.

The present inventors have succeeded in producing cross-linked elastomer composed mainly of alkyl acrylates which has excellent properties and subsequently succeeded in obtaining resin composition having excellent impact resistance with use of the aforesaid elastomer. One of the characterstics of the present invention lies in employing such cross-linked elastomer in a state of latex dispersed in water.

Heretofore, cross-linkage of acrylic rubber has been carried out by kneading such elastomer in a massive form in combination with organic peroxide and aliphatic amines or sulphur at a flow temperature of the elastomer or thereabouts. Typical method thereof is known to use cross-linkage reaction with a lauroyl peroxide-sulphur of triethylenetatramine-sulphur system in combination with elastomer.

However, the cross-linked elastomer obtained by such method as mentioned above is in the form of mass and cannot be dissolved in a solvent because of cross-linkage thereof, and therefore the application of the elastomer thus obtained is limited. For example, the elastomer cross-linked in the manner above-mentioned becomes difficult to yield a resin composition by polymer blending or graft polymerization of said elastomer with other resins.

Accordingly, it is inevitably necessary that such elastomer must be cross-linked in a state of aqueous suspension or latex in order to be not only as a mere elastomer to be used as it is, but also as an elastomer suitable for blending with other resins. The present invention has succeeded in solving completely the above point, that is, it has made it possible to provide resin composition having prominent impact strength as well as good moulding processability and weather resistance by employing a novel cross-linked elastomer obtained in accordance with the present invention.

The present invention is the resin composition which is obtained by blending a cross linked elastomer (A) and a resin polymer latex (B). The elastomer A is obtained by polymerizing a monomer or monomers consisting of 100–65 parts of alkyl acrylate (the alkyl has 1–12 carbon atoms) 0–35 parts of acrylonitrile, and 0–20 parts of a member selected from the group consisting of methacrylic acid and alkyl methacrylate (the alkyl has 1–4 carbon atoms) (the parts indicated herein are parts by weight; and the total of the monomers is 100 parts) with addition of an organic peroxide having a decomposition temperature of 50°–100° C. Alternatively, the elastomer (A) may be obtained by polymerizing said monomer or monomers in an aqueous dispersion and then adding an organic peroxide having a decomposition temperature of up to 100° C. The resin polymer latex (B) is obtained by polymerizing a monomer or monomers consisting of 100–65 parts of at least one member selected from the group consisting of styrene, α-methylstyrene, methyl methacrylate, alkyl acrylate (the alkyl has 1–4 carbon atoms), vinyl acetate, and vinyl chloride, 0–35 parts of acrylonitrile and 0–20 parts of a member selected from the group consisting of acrylic acid and methacrylic acid (the total of the monomer being 100 parts).

Furthermore, the present invention is a method for producing a modified polymer composition (C) obtained by intimately polymerizing the monomer constituting the resin polymer (B) in the presence of the cross linked elastomer (A). Still more, the present invention is a resin composition prepared by blending the modified polymer compositon (C) with the resin polymer (B). All of these resin compositions are characterized in that in each case they contain 7–50 parts of elastomer based on the total weight of the resin. The resin compositions obtained in such manners are excellent in impact resistance, wether resistance and moulding processability. The elastomers composed mainly of alkyl acrylates which are obtained by usual emulsion polymerization, particularly those composed of polyalkyl acrylates, are very soft, tacky and poor in toughness, and therefore they are not suitably employed as rubber. Further, they were found undesirable as the elastomer component for resin composition. Consequently, it is necessary to give toughness to rubber and improve the compatibility with resin by copolymerizing such elastomers with monomer such as acrylonitrile, methacrylic acid and methyl methacrylate. However, the glass transition temperature thereof becomes high with the increase of the monomer to be copolymerized, and this results in the defect of the elastomer thus obtained that the properties thereof are deteriorated; particularly at low temperature, when the elastomers are intended to be used as a component of impact resistant resin. In general, in a process for preparing elastomer, a method has for a long time been known, in which the polymerization is carried out by adding bifunctional monomers, for example, such as divinylbenzene and ethylenedimethacrylate to monomer or a mixture of monomers. When an elastomer composed mainly of alkyl acrylate was produced by the above-mentioned method, the elastomer almost completely dissolved (white turbid) in methyl ethyl ketone, i.e. a solvent for the elastomer, whereby the gel formation was only less than 5%. Further, when the elastomer was prepared with an increased amount of the bifunctional monomers, the similar result was obtained or even when the gel content was more than 80%, the obtained product was poor in toughness as an elastomer, and when it was blended with resin polymer, no impact strength was thereby observed.

The present invention has solved the above drawback. According to the present invention, an elastomer cross linked in any proportion in a state of aqueous latex can be obtained, and thus it is possible to obtain a resin composition having excellent impact strength even when such elastomers as poly-butylacrylate and poly-2-ethylhexyl acrylate, which have heretofore been considered to be entirely out of use. Further, by the method hereinafter described, it becomes possible to highly graft monomer(s) for resin components to this elastomer, thereby obtaining a resin composition having remarkably high impact strength, compared with that conventionally prepared by employing alkyl acrylates.

Further, the present inventors have found that in a process of cross linking reaction with use of an organic peroxide for obtaining a cross linked elastomer, the cross inking efficiency is improved and at the same time the residual peroxide can be removed by adding thereto quinones, for example, such as hydroquinone and benzoquinone in an optimum amount of less than two times equivalent based on the organic peroxide, and further that the cross linking reaction can be carried out even at ow temperature.

In producing the cross linked elastomer (A) according to the present invention, first of all a monomer or monomers consisting of 100–65 parts of alkyl acrylate (the alkyl has 1 to 12 carbon atoms), 0–35 parts of acrylonitrile, and 0–20 parts of a member selected from the group consisting of acrylic acid, methacrylic acid and alkyl methacrylate (the alkyl has 1 to 4 carbon atoms), (the total of the monomers being 100 parts), is maintained at a temperature below 30° C., and into this monomer, an organic peroxide is dissolved. In this case, the amount of organic peroxide to be added is in a range of 0.1 to 5 parts. When the addition amount is less than 0.1 part, no effect can be expected. Even when the addition amount is more than 5 parts, the effect of cross linking can be achieved, but an adverse effect may be encountered by the remaining peroxide in the resin obtained, and therefore it is not necessary to add more than 5 parts of the organic peroxide. The preferable range thereof is from 0.5 to 3 parts. In this case, the organic peroxides to be employed must be those which scarcely decompose at a temperaure below 50° C., and preferably those, of which a greater part are decomposed at 100° C. within 10 hours. This is because, that such organic peroxide is required to give gellation effect (cross linking) on heating after the completion of polymerization, without being decomposed in a process of redox polymerization hereinafter described.

As organic peroxides of this kind, there may be mentioned, for example, such as benzoyl peroxide, 2,4-dichlorobenzoyl peroxide, octanol peroxide, lauroyl peroxide, palmytoyl peroxide, acetyl peroxide, propionyl peroxide, parachlorobenzoyl peroxide, t-butyl peroctate, cyclohexanone peroxide and isopropyl peroxycarbonate.

In the present invention, particularly suitable alkyl acrylate to be employed include such as methyl acrylate, ethyl acrylate, n-butyl acrylate, n-propyl acrylate and 2-ethyl hexylacrylate.

Next, the mixed solution is incorporated with a water soluble redox initiator and is subjected to emulsion polymerization in an aqueous system at a low temperature below 40° C. In this case the redox initiator must be water soluble and should not be oil soluble. Therefore, such initiators as comprising cumene hydroperoxide—monoamine (or polyamine), or hydrogen peroxide—amine system is not suitably employed. Preferred redox initiators, for example, include those having hydrogen peroxide—ferrous salt and potassium persulfate (or ammonium persulfate)—sodium thiosulfate (or sodium hydrogen sulfite) systems.

The polymerization is carried out at a temperature below 40° C., and in this case an organic peroxide dissolved in or adhered to the polymer is uniformly remained in the polymer particles without being practically decomposed. After almost completion of polymerization, when the resulting latex is heated at a temperature of 60° to 100° C. with stirring, the peroxides contained in the polymer particles decompose and the gel fraction is extensively formed in the elastomer by radical produced, thereby obtaining the cross linked elastomer latex (A). The gel formation proportion of the cross linked elastomer used in the present resin composition is preferably illustrated in the swelling degree of 3.0–50, particularly 5–20. The swelling degree may optionally be varied according to the kind and amount of organic peroxide, heating temperature and heating time, and further by addition of compounds of quinones. For example, when the reaction is carried out with addition of 1% by weight of benzoyl peroxide at 90° C. for 5 hours, the swelling degree becomes 9–10, and in case of 80° C. for 5 hours it becomes 15–20. Further, besides the method mentioned above, such cross linked elastomer latex can also be obtained by the following process. That is, similar cross linked elastomer latex to those obtained by the above-mentioned redox emulsion polymerization can be obtained by dissolving said organic peroxide in less than about 15% by weight (based on the weight of the polymer contained in latex) of the same comonomer component as that of the polymer, or in the same amount of a water insoluble solvent such as benzene, methyl ethyl ketone, chloroform, toluene and xylene; adding the resulting peroxide solution to a polymer latex obtained by ordinary emulsion polymerization process, dispersing the same in the polymer latex with thorough stirring and then elevating the temperature of the latex more than the decomposition temperature of said organic peroxide.

The resin polymer latex (B) is obtained by conventionally emulsion polymerizing vinyl monomer(s), i.e. a monomer consisting of 100–65 parts of at least one member selected from the group consisting of methyl methacrylate, styrene, α-methyl styrene, alkyl acrylate (the alkyl has 1 to 4 carbon atoms), vinyl acetate and vinyl chloride, 0–35 parts of acrylonitrile, and 0–20 parts of a member selected from the group consisting of acrylic acid and methacrylic acid (100 parts in the total).

Graft blend in which the monomer constituting (B) is emulsion polymerized in the presence of the cross linked elastomer latex (A), is illustrated below.

In this case, as an initiator to be employed, either water soluble initiator such as potassium persulfate or oil soluble initiator, i.e. any of benzoyl peroxide, azobisisobutyronitrile, lauroyl peroxide and cumene hydroperoxide. The amount of the monomer constituting (B) is regulated so as to make the content of (A) being 7–80 parts. The polymer latex obtained by the abovesaid manner is hereinafter referred to (C). The modified polymer composition (C) is able to provide a resin having sufficiently high impact strength even when it comprises elastomer in an amount of 7–40%.

This is presumably due to high graft efficiency of the resin composition. The comparison of graft efficiency of the resin composition according to this method and that of the resin composition obtained by usual two stage polymerization, i.e. polymerization wherein monomers as resin components are added with use of water soluble radical initiator in the presence of non-cross linked rubber latex, is as shown in Table 1.

TABLE 1

| Polymerization method:[1] | Polymerization temperature, °C. | Graft efficiency percent, |
|---|---|---|
| I | 70 | 5–30 |
| II | 70 | 20–70 |
| III | 70 | 10–40 |

[1] Polymerization method:
I: A two stage polymerization with use of non-cross linked elastomer.
II: A process which comprises employing the cross linked elastomer (A) and the polymerization initiator employed at the second stage being peroxide.
III: A process which comprises employing the cross linked elastomer (A) and the polymerization initiator employed at the second stage being water soluble initiator.

The reason why the product obtained by the above polymerization method II has a higher graft efficiency than the polymer obtained by the polymerization method I, is not clarified, but it is considered to be attributable to the difference of viscosity of the part (within the elastomer particles) where the second stage polymerization proceeds. That is, the elastomer particles are high in viscosity, because they are cross linked by an organic peroxide, whereby a large amount of grafted polymer may be produced. Since the modified polymer composition (C) is difficult to regulate its intrinsic viscosity [η] (the addition of conventional chain transfer agents excessively lowers graft efficiency), the resin composition is prepared by suitably blending further the above-mentioned polymer (B) therewith in order to improve its moulding processability. The intrinsic viscosity [η] of the polymer (B), for example, in case the polymer for the resin component is styrene-acrylonitrile copolymer, is 0.3–1.5 (measured in dimethylformaldehyde at 25° C.). There are various methods for blending the polymer (A), (B) and (C), however, the most desirable method is a method which comprises blending the respective polymers with each other in a state of latex, and subjecting the resulting blend to salting out, washing and drying, and, if desired, the blend may be further subjected to kneading treatment in a molten state with a suitable kneader for 3–60 minutes. Furthermore, after singly subjecting each latex of the elastomer and resin polymer to salting out, washing and drying, it may also be possible to carry out dry-blend by blending the elastomer with resin polymer in a molten state with use of a kneader. In this case, the kneading temperature is preferably 130°–250° C. By these processes the elastomer particles present in the resin composition are suitably dispersed. The present invention is further illustrated more particularly by referring to the example. The technical terms and testing methods used in these examples are explained hereinbelow.

Falling-ball impact strength:

Sample: Compression-moulded plate of 3.5 mm. in thickness and 125 mm. in diameter.
Measurement: In accordance with JIS B–1052, a distance at which the sample is broken is expressed in cm.
Weights of steel balls employed: 533.3 g. and 286 g.

Dynstat impact value:
Unit: Kg.-cm./cm.$^2$
Sample: Injection moulded plate (2 mm. thickness)
Testing machine: Dynstat impact testing machine (manufactured by Toyo Seiki K. K.)

Swelling degree of rubber and gel content thereof:
Swelling of film was effected by immersing it in methyl ethyl ketone at 30° C. for 24 hours, and the swelling degree and gel content were measured according to the following equations.

$$\text{Swelling degree} = \frac{W_2 - W_3}{W_3}$$

$$\text{Gel content (percent)} = \frac{W_3}{W_1} \times 100$$

wherein $W_1$, $W_2$ and $W_3$ represent the weight of sample, weight of sample after swelling and dry weight of sample after swelling respectively.

Weathering test: The test was carried out with WE–II type weather-meter manufactured by Toyo Rika K. K.

Softening point: Films of 0.1–0.07 mm. in thickness were prepared by compression moulding, and were made into sample pieces of 10 x 40 mm. The relations between elongation and temperature thereof were plated, and the exterporated value thereby obtained is determined as the softening point.

Heat distortion temperature: The temperature was obtained by measurement in accordance with ASTM D–648.

COMPARATIVE EXAMPLE 1

Production of polymer A

A–I:                                                        Parts
 n-Butyl acrylate _____ 180
 Acrylonitrile _____ 20
 Benzoyl peroxide (BPO) _____ 2
 Potassium persulfate (KPS) _____ 0.7
 Sodium hydrogen sulfite (NaHSO$_3$) _____ 0.37
 Sodium pyrophosphate _____ 0.2
 Sodium lauryl sulfate _____ 7
 Deionized water _____ 400

BPO was first dissolved in a mixture of monomers at 15° C. Next, the resulting solution was added to an aqueous solution in which 5 parts of emulsifying agent (sodium lauryl sulfate) and redox initiator (KPS-NaHSO$_3$) were dissolved, and the reaction was carried out at 35° C. for 5 hours. A part of the resulted latex was taken out therefrom for obtaining the rate of polymerization, whereby it was found to be 92.5%, and it dissolved in methyl ethyl ketone, whereby no gel formation was observed. Next, the remaining 2 parts of the emulsifying agent was further dissolved therein, and the reaction was further carried out for 5 hours at the elevated reaction temperature of 90° C. After completion of reaction, the rate of polymerization was measured to be 98.8%, and a cross linked elastomer was obtained which was insoluble in methyl ethyl ketone, and having gel content of 94.5% and swelling degree of 13.5.

A–II:                                                          Parts
   n-Butyl acrylate _____ 180
   Acrylonitrile _____ 20
   Potassium persulfate (KPS) _____ 0.7
   Sodium lauryl sulfate _____ 7
   Sodium pyrophosphate _____ 0.2
   Deionized water _____ 400

The above composition is the same as in A–I except that BPO and sodium hydrogen sulfite were excluded therefrom. With this composition, the emulsion polymerization was carried out according to the usual method at 70° C. for 5 hours. The rate of polymerization was 98.8%, and no gel formation was observed. A part of the resulting latex was taken out therefrom, and BPO was dissolved in a small amount of benzene (the volume thereof being corresponding to 1/30 of the total volume) in such a manner so that the amount of BPO is 1% by weight based on the weight of polymer present in the latex, and the resulting solution was added to the reaction system and BPO was successively dispersed therein at room temperature with stirring for one hour. Then, the temperature of the system was elevated to 90° C. and was reacted for 5 hours. The gel content of the elastomer thus obtained was 95%, and the swelling degree thereof was 12.0.

Production of resin polymer B

B–I:                                                           Parts
   Styrene _____ 750
   Acrylonitrile _____ 250
   Potassium persulfate (KPS) _____ 3.5
   Sodium lauryl sulfate _____ 30
   Deionized water _____ 3000
   Lauryl mercaptan _____ 5.5

With the above charged composition, the reaction was carried out in $N_2$ atmosphere at 60° C., for 3 hours and further reacted at 75° C. for 1 hour. The following results were obtained.

Rate of polymerization, percent _____ 100
[η] _____ 0.71

The intrinsic viscosity [η] was a value measured in dimethylformamide at 25° C.

B–II:                                                          Parts
   Methyl methacrylate _____ 800
   Acrylonitrile _____ 200

B–II:—Continued                                               Parts
   Potassium persulfate _____ 3.5
   Sodium lauryl sulfate _____ 30
   Lauryl mercaptan _____ 5.5
   Deionized water _____ 3000

The polymerization was carried out in the same manner as in B–I. The results obtained were as follows:

Rate of polymerization, percent _____ 99
[η] _____ [1]0.68

[1] Measured in DMF at 25° C.

Production of polymer C

A part of polymer A–I was employed as a component of the following composition which was subject to polymerization.

Parts
Polymer A–I _____ [1]600
Deionized water _____ 800
Styrene _____ 150
Acrylonitrile _____ 50
Sodium lauryl sulfate _____ 4
BPO _____ 0.3

[1] 200 parts in terms of polymer.

In carrying out the reaction, 600 parts of polymer A–I was first dispersed in 750 parts of deionized water, and the mixed styrene-acrylonitrile monomers containing benzoyl peroxide was added thereto drop by drop. An aqueous solution of sodium lauryl sulfate was dropped thereinto so that their concentration is lower than the Critical Micelle concentration and further the total amounts of the monomer mixture and emulsifying agent were dropped thereinto in about 3 hours. Then, the reaction was continued for 2 hours at 70° C. The rate of polymerization was 99.5%.

The resin compositions were prepared as follows:

R–1: Latexes of polymer A–II and polymer B–I were mixed with each other so that the amount of polymer A–II may be 25% based on the total amount of mixture. The mixture was stirred at room temperature for one hour, then the resulting mixture was poured into a 0.05% aqueous solution of aluminum chloride and the resulting product was subjected to salting out, filtering and thoroughly washing with water. The resulting product was further washed with methanol and dried in a vacuum drier at 60° C.

R–2: Latexes of polymer A–II and polymer B–II were blended and dried in the same manner as in R–1.

R–3: Polymer C and polymer B–I were blended in a state of latex so that the elastomer content may be 25% based on the total amount of the blended product, and were treated and dried in the same manner as in R–1.

Falling-ball impact strength and weather resistants (based on changes in impact strength) of compression moulded plates prepared from the resin compositions of R–1 to R–3 and presently marketed resins shown in the following table, were investigated. The results were as denoted in Table 2.

TABLE 2

| | Breaking strength (height: cm.) | | Exposure time with Weather-o-meter | | | Process-ability |
|---|---|---|---|---|---|---|
| | | | 105 (hr.) equivalent half year | 210 (hr.) equivalent one year | 420 (hr.) equivalent 2 years | |
| | [1] 1 | [2] 2 | [1] 1 | [1] 1 | [1] 1 | |
| Sample: | | | | | | |
|   R–1 | >220 | >220 | >220 | >220 | 210 | Good. |
|   R–2 | >220 | >220 | >220 | >220 | 200 | Slight bad. |
|   R–3 | >220 | >220 | >220 | >220 | >220 | Do. |
| Marketed: | | | | | | |
|   AS resin | 30 | 20 | 30 | 30 | 20 | Good. |
|   High impact polystyrene | 30 | 50 | 50 | 30 | 25 | Do. |
|   ABS resin A | 130 | 100 | 100 | 80 | 70 | Do. |
|   ABS resin B | >220 | >220 | 140 | 80 | 40 | Do. |
| Transparent ABS resin | >220 | >220 | 100 | 80 | 60 | Do. |

[1] Steel ball of 286 g.
[2] Steel ball of 533 g.
ABS–A Medium impact resistant type.
ABS–B High impact resistant type.

As is clear from the above results, it is understood that the resin compositions in accordance with the present invention have good impact strength and they are very excellent in weather resistance.

Following the above-mentioned comparative example, the present invention is illustrated in detail by referring to the following examples. All the figures in parts representing resin compositions herein used are parts by weight.

PRODUCTION OF ELASTOMER (A)

The same polymerization as in polymer (A) of Comparative Example 1, was employed.

PRODUCTION OF POLYMER (C)

The same polymerization method as in polymer (C) of Comparative Example 1.

| Resin composition No. | Kind of polymer A | Composition of monomer charged | Ratio polymer (A)/Polymer obtained in the left column |
|---|---|---|---|
| C-1 | A-1 | St, 75; AN, 25 | 60/40 |
| C-2 | A-2 | St, 75; AN, 25 | 25/75 |
| C-3 | A-2 | MMA, 80; AN, 20 | 25/75 |
| C-4 | A-2 | St, 70; MMA, 10; AN, 20 | 60/40 |
| C-5 | A-8 | St, 75; AN, 25 | 60/40 |
| C-6 | A-18 | St, 75; AN, 25 | 60/40 |
| C-7 | A-22 | EA, 10; VCl, 90 | 20/80 |
| C-8 | A-2 | St, 68; AN, 22; BuA, 10 | 25/75 |

| Resin composition No. | Composition | Kind and amount of peroxide or cross linking agent, percent | Cross linking treatment Temp., °C | Time, hr. | Quinones employed, kind and amount, percent | Swelling degree | Remarks |
|---|---|---|---|---|---|---|---|
| A-1 | BuA, 90; AN, 10 | 0 | 90 | 5 | None | infinity | Comparative example. |
| A-2 | BuA, 90; AN, 10 | BPO, 1 | 90 | 5 | do | 12.0 | |
| A-3 | BuA, 90; AN, 10 | BPO, 2 | 90 | 5 | do | 8.1 | |
| A-4 | BuA, 90; AN, 10 | BPO, 1 | 80 | 2 | BQ, 1 | 10.5 | |
| A-5 | BuA, 90; AN, 10 | BPO, 1 | 80 | 2 | HQ, 1 | 10.5 | |
| A-6 | BuA, 90; AN, 10 | BPO, 1 | 90 | 3 | None | 14.7 | |
| A-7 | BuA, 90; AN, 10 | BPO, 0.5 | 90 | 5 | HQ, 1 | 12.3 | |
| A-8 | BuA, 90; AN, 10 | EDMA, 1 | 90 | 5 | None | infinity | Do. |
| A-9 | BuA, 90; AN, 10 | EDMA, 3 | 90 | 5 | do | infinity | Do. |
| A-10 | BuA, 90; AN, 10 | DVB, 1 | 90 | 5 | do | infinity | Do. |
| A-11 | BuA, 90; AN, 10 | DVB, 3 | 90 | 5 | do | infinity | Do. |
| A-12 | BuA, 90; AN, 10 | t-BP, 1 | 90 | 5 | do | 11.5 | |
| A-13 | BuA, 90; AN, 10 | Acetyl peroxide, 1 | 90 | 5 | do | 12.6 | |
| A-14 | BuA, 90; AN, 10 | Propyl peroxide, 1 | 90 | 5 | do | 11.8 | |
| A-15 | BuA | BPO, 1 | 90 | 1 | BQ, 1 | 10.7 | |
| A-16 | EA | BPO, 1 | 90 | 1 | BQ, 1 | 11.0 | |
| A-17 | BuA, 90; AN, 5; MAA, 5 | BPO, 1 | 90 | 1 | BQ, 1 | 10.0 | |
| A-18 | 2EHA, 90; AN, 10 | BPO, 1 | 90 | 1 | BQ, 1 | 11.6 | |
| A-19 | 2EHA, 70; BuA, 20; AN, 10 | BPO, 1 | 90 | 1 | BQ, 1 | 12.0 | |
| A-20 | BuA, 80; AN, 10; AA, 10 | BPO, 1 | 90 | 1 | BQ, 1 | 12.0 | |
| A-21 | BuA, 80; AN, 5; MMA, 15 | BPO, 1 | 90 | 1 | BQ, 1 | 10.2 | |
| A-22 | BuA, 90; AN, 10 | t-BP, 1 | 95 | 2 | None | 13.0 | |
| A-23 | EA, 95; MAA, 5 | BPO, 1 | 97 | 2 | do | 9.5 | |
| A-24 | 2EHA, 93; AA, 7 | BPO, 1 | 97 | 2 | do | 10.5 | |

Explanation of abbreviation;
BuA, n-butyl acrylate.
EA, ethyl acrylate.
2EHA, 2-ethylhexyl acrylate.
AN, acrylonitrile.
MMA, methyl methacrylate.
MAA, methacrylic acid.
St, styrene.
AA, acrylic acid.
α-MeSt, α-methyl styrene.
90-5, reaction is effected at 90° C. for 5 hours;
BQ, benzoquinone.
HQ, hydroquinone.
BPO, benzoyl peroxide.
EDMA, ethylenedimethacrylate;
DVB, divinylbenzene.
t-BP, t-butyl peroctate.
VCl, vinyl chloride.
VAC, vinyl acetate.

PRODUCTION OF RESIN COMPONENT POLYMER (B)

The same polymerization method as in resin polymer (B) of Comparative Example 1.

| Resin composition No.: | Composition of monomer charged | $[\eta]$ |
|---|---|---|
| B-1 | St, 80; AN, 20 | 0.70 |
| B-2 | St, 75; AN, 25 | 0.71 |
| B-3 | St, 70; AN, 30 | 0.65 |
| B-4 | St, 70; AN, 20; MAA, 10 | 0.60 |
| B-5 | MMA, 100 | 0.50 |
| B-6 | MMA, 90; AN, 10 | 0.60 |
| B-7 | MMA, 80; AN, 20 | 0.64 |
| B-8 | MMA, 70; AN, 30 | 0.61 |
| B-9 | VCl, 100 | 0.17 |
| B-10 | VCl, 90; VAC, 10 | 0.13 |
| B-11 | St, 75; AN, 25 | 0.56 |
| B-12 | St, 60; BuA, 15; AN, 25 | 0.75 |
| B-13 | St, 37; α-MeSt, 37; AN, 26 | 0.64 |

Blend method in Examples 17, 18, 19, 26 and 27 is referred to D. This means the blending in which each latex was separately subjected to salting out, washing and drying, and then was knead-treated at 180° C. with a kneader. Blending in other examples were employed a latex-blend in which blending is carried out in a state of latex.

In the following examples, the difference between Examples 8 and 30, and those of 6, 12, 18 and 40 is attributed to the effect of methacrylic acid. When the acid is present either in resin component or rubber component, the softening points of the resin compositions are raised to a range of from 240° to 250° C. This fact means that thermal resistance of a resin composition can be improved by incorporating such acid monomer into said resin composition. Further, the resin compositions obtained in Examples 21–24 wherein bifunctional monomers were employed in cross linking elastomer are significantly low in impact strength, compared with those obtained by cross

EVALUATION OF RESIN COMPOSITIONS

| Example | Polymer (A) | Polymer (B) | Polymer (C) | Elastomer/resin | Blend method | Breaking distance falling-ball 533 g. (cm.) | Dynstat impact value, kg-cm./cm.² | Tensile strength, kg./cm. | Elongation, percent | Softening temperature, °C. | Heat distortion temperature | Remarks |
|---|---|---|---|---|---|---|---|---|---|---|---|---|
| 1 | A-1 | B-1 | | 25/75 | | 70 | <6 | 400-450 | 3-10 | | | Comparative example. |
| 2 | A-1 | B-7 | | 25/75 | | 70 | <6 | 370-450 | 2-9 | | | Do. |
| 3 | A-2 | B-1 | | 10/90 | | 100 | 7-10 | 450-530 | 3-10 | | | |
| 4 | A-2 | B-1 | | 15/85 | | 180 | 15 | 450-500 | 7-10 | | | |
| 5 | A-2 | B-1 | | 25/75 | | >220 | 25-70 | 320-420 | 15-28 | | | |
| 6 | A-2 | B-2 | | 25/75 | | >220 | 25-80 | 350-450 | 20-30 | 170-175 | 97 | |
| 7 | A-2 | B-3 | | 25/75 | | >220 | 30-45 | 300-450 | 20-35 | 240-250 | 99 | |
| 8 | A-2 | B-4 | | 25/75 | | >220 | 30-40 | 380-450 | 3-10 | | | |
| 9 | A-2 | B-5 | | 25/75 | | 70 | 7 | 550-630 | 1-3 | | | Do. |
| 10 | A-2 | B-6 | | 25/75 | | 30 | <3 | | | | 92 | |
| 11 | A-2 | B-7 | | 25/75 | | 200 | 30-40 | 360-430 | 20-35 | 165-170 | 87 | |
| 12 | A-2 | B-8 | | 25/75 | | >220 | 5-40 | 320-450 | 30-35 | | | |
| 13 | A-2 | B-9 | | 25/75 | | 100 | 30-60 | 250-350 | 35-40 | | | |
| 14 | A-2 | B-10 | | 25/75 | | 80 | 30-45 | 320-350 | 30-40 | | | |
| 15 | A-2 | B-11 | | 25/75 | | >220 | 30-40 | | | | | |
| 16 | A-3 | B-2 | | 25/75 | | >220 | 30-60 | | | | | |
| 17 | A-4 | B-2 | | 25/75 | D | >220 | 30-60 | 420-450 | 15-20 | 170-175 | 98 | |
| 18 | A-5 | B-2 | | 25/75 | D | >220 | 30-60 | | | | | |
| 19 | A-6 | B-2 | | 25/75 | D | 150 | 17 | 350-400 | 5-12 | | | Do. |
| 20 | A-7 | B-2 | | 25/75 | | 70 | <7 | | | | | Do. |
| 21 | A-8 | B-2 | | 25/75 | | 60 | <5 | 300-400 | 3-7 | | | Do. |
| 22 | A-9 | B-2 | | 25/75 | | 80 | <8 | | | | | Do. |
| 23 | A-10 | B-2 | | 25/75 | | >220 | 18 | | | | | |
| 24 | A-11 | B-2 | | 25/75 | D | >220 | 18 | | | | | |
| 25 | A-12 | B-2 | | 25/75 | | 160 | 10 | | | | | |
| 26 | A-13 | B-2 | | 25/75 | | 150 | 25-40 | 450-500 | 15-20 | 230-240 | 99 | |
| 27 | A-14 | B-2 | | 25/75 | | >220 | | 400-420 | 15-20 | | | |
| 28 | A-15 | B-2 | | 25/75 | | 200 | | 360-430 | 20-25 | | | |
| 29 | A-16 | B-2 | | 25/75 | | >220 | 25-40 | 320-400 | 30-40 | | | |
| 30 | A-17 | B-2 | | 25/75 | | >220 | 4 | 320-400 | 3-7 | | | Do. |
| 31 | A-18 | B-2 | | 25/75 | | 50 | <5 | | | | | Do. |
| 32 | A-19 | B-2 | | 25/75 | | 40 | 10-20 | 300-380 | 30-40 | | | |
| 33 | A-20 | B-2 | | 25/75 | | 200 | 10-25 | | | | | |
| 34 | A-4 | B-7 | | 25/75 | | 200 | | | | | | |
| 35 | A-9 | B-7 | | 25/75 | | >220 | 35-40 | 280-420 | 35-40 | 167-170 | 85 | |
| 36 | A-11 | B-7 | | 25/75 | | >220 | 40-70 | 400-450 | 15-30 | | | |
| 37 | A-17 | B-7 | | 25/75 | | 200 | 10-20 | | | | | |
| 38 | A-18 | B-7 | | 25/75 | | 180 | | | | | | |
| 39 | A-2 | B-12 | | 25/75 | | 200 | 30-45 | 350-450 | 25-30 | | | |
| 40 | A-21 | B-6 | | 25/75 | | 160 | | | | | | |
| 41 | A-2 | B-13 | | 25/75 | | 120 | | | | | | |
| 42 | A-22 | B-2 | | 20/80 | | >220 | | | | | | |
| 43 | A-23 | B-6 | | 20/80 | | 160 | | | | | | |
| 44 | A-24 | B-2 | | 20/80 | | 180 | | | | | | |
| 45 | | B-2 | C-2 | 20/80 | | >220 | | | | | | |
| 46 | | B-5 | C-3 | 20/80 | | 120 | | | | | | |
| 47 | | B-6 | C-7 | 20/80 | | 160 | | | | | | |
| 48 | | B-7 | C-8 | 20/80 | | 120 | | | | | | |
| 49 | | B-8 | C-3 | 20/80 | | >220 | | | | | | |
| 50 | | B-4 | C-1 | 20/80 | | 180 | | | | | | |
| 51 | | B-4 | C-3 | 20/80 | | >220 | | | | | | |
| 52 | | B-4 | C-3 | 20/80 | | >220 | | | | | | |
| 53 | | B-9 | C-3 | 20/80 | | >220 | | | | | | |
| 54 | A-2 | B-4 | C-1 | 25/75 | | >220 | | | | | | |
| 55 | | B-2 | C-2 | 25/75 | | >220 | | | | | | |
| 56 | | B-2 | C-4 | 25/75 | | >220 | 30-45 | | | | | Do. |
| 57 | A-2 | B-2 | C-5 | 25/75 | | 70 | 6 | | | | | |
| 58 | A-2 | B-2 | C-6 | 25/75 | | >220 | 30-50 | | | | | Do. | linking elastomer using an organic peroxide such as BPO and the like, and above fact show that such bifunctional monomers are not effective in the preparation of resin composition of this kind.

What is claimed is:

1. A resin composition consisting of 7–50 parts of a cross linked elastomer (A) prepared by reacting (1) a polymer latex obtained by emulsion polymerizing a monomer consisting of 100–65 parts of alkyl acrylate whose alkyl has 1 to 12 carbon atoms, 0–35 parts of acrylonitrile and 0–20 parts of a member selected from the group consisting of acrylic acid, methacrylic acid and alkyl methacrylate whose alkyl has 1 to 4 carbon atoms with (2) an organic peroxide to cross-link said polymer latex and 93–50 parts of a resin polymer (B) obtained by emulsion polymerizing a monomer consisting of 100–65 parts of at least one member selected from the group consisting of styrene, α-methyl styrene, methyl methacrylate, vinyl acetate, vinyl chloride and alkyl acrylate whose alkyl has 1 to 4 carbon atoms, 0–35 parts of acrylonitrile and 0–20 parts of a member selected from the group consisting of acrylic acid and methacrylic acid.

2. A resin composition according to claim 1 wherein 7–50 parts of the cross linked elastomer (A) and 93–50 parts of the resin polymer (B) respectively is blended in the form of latex.

3. A resin composition according to claim 1 wherein 7–50 parts of the cross linked elastomer (A) and 93–50 parts of the resin polymer (B) respectively is blended in a dried state.

4. A resin composition according to claim 1 wherein 93–50 parts of monomer constituting the resin polymer (B) is emulsion polymerized in the presence of 7–50 parts of the cross linked elastomer (A).

5. A resin composition which is obtained by blending 7–50 parts of latex cross linked elastomer (A) prepared by adding an organic peroxide having a decomposition temperature of 50°–100° C. to a monomer consisting of 100–65 parts of alkyl acrylate whose alkyl has 1 to 12 carbon atoms, 0–35 parts of acrylonitrile and 0–20 parts of at least one member selected from the group consisting of acrylic acid, methacrylic acid and alkyl methacrylate whose alkyl has 1 to 4 carbon atoms, the total of the monomers being 100 parts, emulsion polymerizing the resulting mixture at a temperature below 40° C. using a water soluble redox initiator, heating the resulting polymer latex to a temperature above 50° C., adding at least one member selected from the group consisting of hydroquinone and benzoquinone to the latex cross linked in the form of latex, and subjecting the resulting product to treatment with stirring, with 93–50 parts of a resin polymer latex (B) obtained by emulsion polymerizing a monomer consisting of 100–65 parts of at least one member selected from styrene, α-methyl styrene, methyl methacrylate, vinyl acetate, vinyl chloride and alkyl acrylate whose alkyl has 1 to 4 carbon atoms, 0–35 parts of acrylonitrile and 0–20 parts of a member selected from the group consisting of acrylic acid and methacrylic acid, the total of the monomers being 100 parts.

References Cited

UNITED STATES PATENTS 3,041,309 6/1962 Baer.
3,345,434 10/1967 Griffith _____ 260—901

FOREIGN PATENTS 870,015 6/1961 Great Britain.

SAMUEL H. BLECH, Primary Examiner

H. ROBERTS, Assistant Examiner

U.S. Cl. X.R.

260—875, 901, 885, 881, 884, 898, 899, 86.1, 89.5